US006839557B1

(12) United States Patent
Bonnard et al.

(10) Patent No.: US 6,839,557 B1
(45) Date of Patent: Jan. 4, 2005

(54) METHOD AND APPARATUS FOR TRANSMITTING DATA OVER A SPEECH CHANNEL BY ENCODING THE DATA USING A SELECTED TYPE OF SOURCE ENCODING

(75) Inventors: Pierre Bonnard, Suresnes (FR); Laurent Cruchant, Paris (FR); Frédéric Lejay, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/700,918

(22) PCT Filed: Mar. 30, 2000

(86) PCT No.: PCT/FR00/00801

§ 371 (c)(1),
(2), (4) Date: Nov. 21, 2000

(87) PCT Pub. No.: WO00/60888

PCT Pub. Date: Oct. 12, 2000

(30) Foreign Application Priority Data

Apr. 6, 1999 (FR) ............................................ 99 04239

(51) Int. Cl.$^7$ ................................................ H04Q 7/20
(52) U.S. Cl. ..................... 455/422.1; 455/517; 370/465
(58) Field of Search ................................ 455/445, 422, 455/517, 550, 556, 422.1; 370/522, 345, 328, 465, 341; 704/222, 270

(56) References Cited

U.S. PATENT DOCUMENTS

| 5,325,432 | A | * | 6/1994 | Gardeck et al. | ............. | 380/273 |
| 5,566,181 | A | * | 10/1996 | Huang et al. | ................. | 370/312 |
| 5,732,337 | A | * | 3/1998 | Wargnier et al. | ............ | 455/144 |
| 5,953,657 | A | * | 9/1999 | Ghisler | ......................... | 455/417 |
| 6,085,089 | A | * | 7/2000 | Emmer et al. | ............... | 455/439 |
| 6,108,560 | A | * | 8/2000 | Navaro et al. | ............... | 455/517 |
| 6,125,120 | A | * | 9/2000 | Lehtimaki | .................... | 370/435 |
| 6,134,242 | A | * | 10/2000 | Aftelak | ......................... | 370/465 |
| 6,138,022 | A | * | 10/2000 | Strawczynski et al. | ...... | 455/445 |
| 6,172,974 | B1 | * | 1/2001 | Tseng et al. | ................. | 370/357 |
| 6,256,612 | B1 | * | 7/2001 | Vo et al. | ...................... | 704/500 |
| 6,295,302 | B1 | * | 9/2001 | Hellwig et al. | .............. | 370/522 |
| 6,308,063 | B1 | * | 10/2001 | Koistinen et al. | ......... | 455/422.1 |
| 6,349,197 | B1 | * | 2/2002 | Oestreich | .................... | 455/63.1 |
| 6,434,139 | B1 | * | 8/2002 | Liu et al. | ..................... | 370/352 |
| 6,633,840 | B1 | * | 10/2003 | Bonnard et al. | ............. | 704/229 |

FOREIGN PATENT DOCUMENTS

| GB | 2 316 277 A | 2/1998 |
| WO | WO 97/29566 | 8/1997 |

OTHER PUBLICATIONS

European Telecommunications Standards Institute (ETSI) "Digital cellular telecommunications system (Phase 2+); Tandem free operation (TFO); Service description; Stage 1; GSM 02.53 version 5.1.0", European Telecommunication Standard, Jan. 1998, pp. 1–10, XP002126133.

* cited by examiner

*Primary Examiner*—Tilahun Gesesse
(74) *Attorney, Agent, or Firm*—Sughrue Mion, PLLC

(57) ABSTRACT

The invention relates to a method of transmitting data over a mobile telephone speech channel between a radio telephone terminal having a type of source encoding and a data transceiver unit via a mobile telephone network supporting at least one mode of communication without transcoding that can be set up between two mobile telephones having at least one type of source encoding in common. In the method, while negotiating the mode of communication between said radio telephone terminal and said data transmitter and/or receiver unit, the transmitter and/or receiver unit sends one of the types of source encoding available to said terminal to the terminal to engage said mode of communication without transcoding. Thereafter, data is transmitted over the mobile telephone network in frames reserved for speech signals encoded using the type of source encoding selected for the mode of communication.

18 Claims, 2 Drawing Sheets

FIG_1

Figure 1:
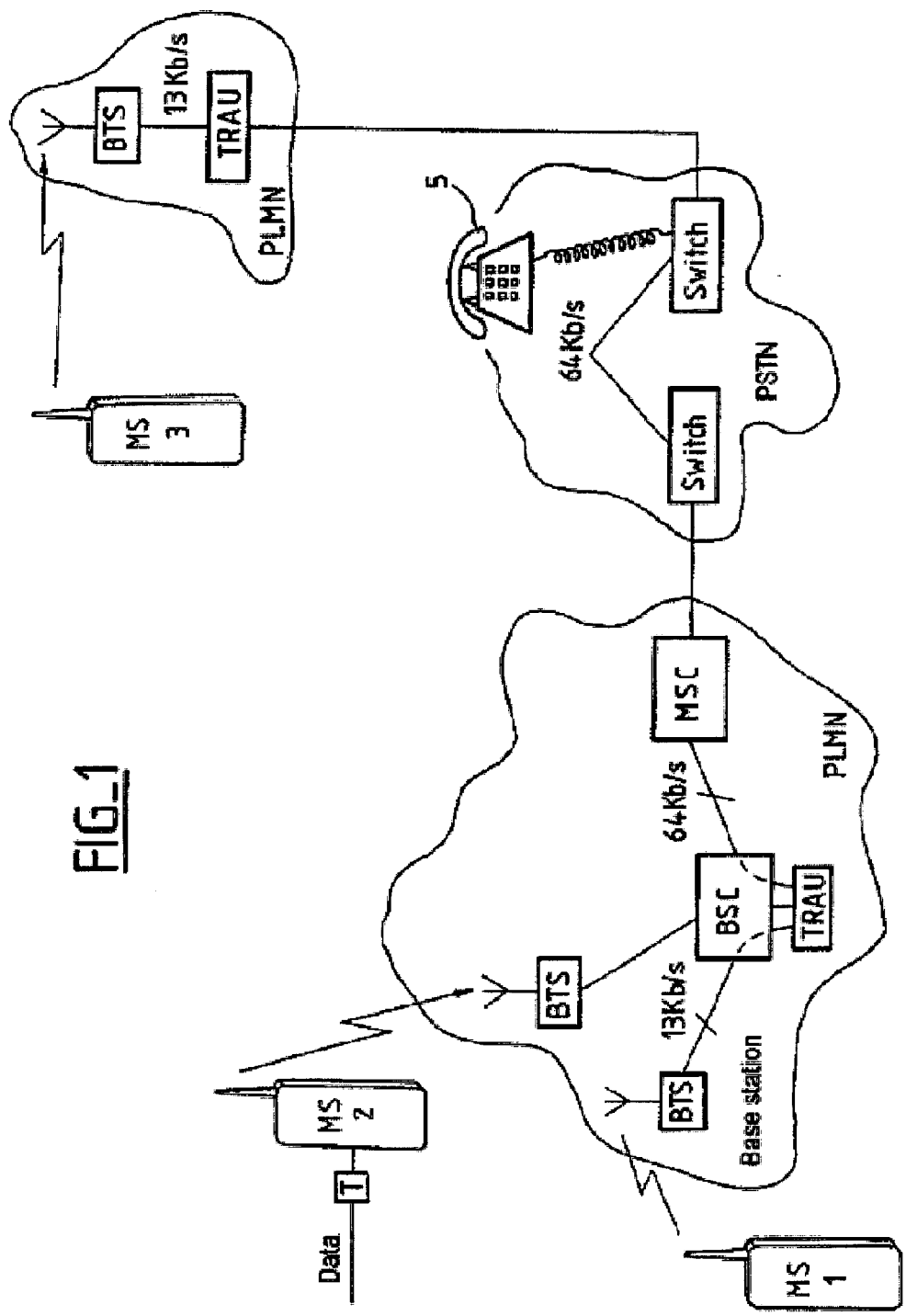

METHOD AND APPARATUS FOR TRANSMITTING DATA OVER A SPEECH CHANNEL BY ENCODING THE DATA USING A SELECTED TYPE OF SOURCE ENCODING

The present invention relates to a method of transmitting data over a speech channel in the field of mobile telephony. The invention resolves problems associated with the special features of data transmission when it is performed over a speech channel and can be subjected therein to transcoding corresponding to speech encoding in a network.

In the field of mobile telephony, speech transmission channels and data transmission channels are known. Data transmission channels require encoding that is different from speech encoding. They make use of network equipment that is specific to data mode. In practice, a specific subscription needs to be taken out for this purpose with a mobile telephone operator. This makes it possible to have access to point-to-point data transmission in circuit-switched mode at a speed of 9600 bits per second.

In the field of GSM cellular telephony, data transmission means are also available that make use of the signalling channels of the cellular system. For this purpose, there are so-called short message service (SMS) channels which allow transmission at up to 300 bits per second, and unstructured supplementary service data (USSD) channels for conveying data rates of about 800 bits per second. In both cases, the rate is low. With USSD, information passes only from a user to the network. With SMS channels, information can be interchanged user to user or network to user, and billing is based on the number of packets exchanged, with the present cost being high.

The object of the invention is to enable any data to be transmitted over a mobile telephone network at a high rate but without that requiring an additional subscription to be taken out.

In particular, the invention makes it possible to implement Internet access services. It also enables a manufacturer to update and maintain terminals.

The difference between speech encoding and data encoding, in particular for mobile telephone transmission, lies essentially in the nature of the digitized information that represents speech. If speech were to be digitized in simple manner, it would produce a plethora of digital information. In the context of mobile telephony, in order to avoid the bandwidth requirements that transmission channels would need at excessive data rates, special types of speech encoding have been developed.

These special types of encoding, known as source encoding, are based on the principle of seeking characteristics that are representative of human speech production. These characteristics include three magnitudes. The magnitudes are as follows:

a fundamental frequency or "pitch" corresponding to vibration of the vocal cords;

filtering corresponding to modifications imparted to the fundamental vibration as a result of the vibration propagating through the sound producing system, i.e. the larynx, the pharynx, and the mouth; and excitation (or error) corresponding to a residue after applying the preceding model to uttered speech.

A GSM type source encoder establishes the best values for those three types of magnitude on the basis of a pulse code modulated (PCM) signal. A PCM signal is a sampled signal derived from the speech signal, for example it can be sampled at 8000 Hz and quantized on 13 bits. The data rate of the PCM signal is thus 104 kbit/s in this example. The source encoder performs an "analysis" or encoding step on the PCM signal.

Various different types of source encoding are in existence. Thus, in the example of a GSM network, there are three types of source encoding in particular:

full rate (FR); ETSI SMG Recommendation 6.10;

half rate (HR); ETSI SMG Recommendation 6.20; and enhanced full rate (EFR); ETSI SMG Recommendation 6.60.

Naturally, the principles of the present invention are equally applicable to other mobile telephony networks (DCS-1800, PCS, etc. . . . ).

FIG. 1 shows a mode of communication between two mobile stations that do not have a type of source encoding in common.

As can be seen in the figure, encoded and protected speech information is transmitted by a mobile telephone MS1 to a public land mobile network (PLMN). The PLMN decodes the speech information of the channel in base transceiver stations (BTS) and produces data in the GSM speech format, i.e. as though it were coming from a source encoder. The PLMN then transcodes the data from GSM speech format to data in a format that is commonly used circuit-switched telephone networks. This format is known as A-law PCM and leads to a data rate of 64 kbit/s corresponding to 8000 samples per second encoded on 8 bits. This transcoding is performed by equipment known as a transcoder rate adaptation unit (TRAU) in the PLMN and generally situated in the mobile services switching centers (MSCs) of the network.

The transcoding performed by the TRAU consists in synthesizing speech by a decoder equivalent to the inverse of the source encoding process described above. A speech signal is then obtained in PCM format comprising 8000 samples per second and encoded on 13 bits, like the original signal, and then a logarithmic transformation known as the A-law transformation is applied thereto so as to encode each sample on 8 bits (giving 64 kbit/s). This new form of the speech signal contains all of the physical information of the preceding signal in GSM format, ignoring transmission and transcoding errors. This signal in A-law PCM format is transmitted to a public-switched telephone network (PSTN), in particular a wired network.

In the PSTN, this 64 kbit/s signal is either transformed into an analog signal or is transmitted over digital circuits. It is then taken to a destination on the switched network, e.g. telephone set 5.

Or else it is taken to further equipment of the TRAU type if the destination is, for example, another mobile telephone MS3 likewise connected to a mobile telephone cellular network. This other TRAU equipment performs transformation that is the inverse of the first TRAU equipment and is referred to herein as inverse TRAU, so as to return to GSM format and data rate.

It can thus be seen in FIG. 1 that the initial speech signal in GSM format at 13 Kbit/s can thus be subjected to several stages of TRAU or inverse TRAU transcoding. Each transcoding and transmission stage can degrade the content of the signal. In particular, if it is desired to reestablish GSM format at 13 Kbit/s at the reception end of the chain, the audible speech will be very close to that at the transmission end of the chain, but the values of the (LTP, LAR, RPE) model can be significantly different.

When it is desired to use a speech channel for transmitting data, it is therefore not possible merely to replace bits describing these parameters in the transmitter by data for transmission in order to be able to recover that data at a receiver. By acting in that way, errors would appear at the end of the chain. In addition, transcoders are specifically adapted to manipulating parameters that are typical of human speech. If the bits describing these parameters are replaced by raw data, bit configurations are obtained that a priori, are random. It is then possible that the analysis and synthesis circuits will not be able to reproduce such configurations. For example, this occurs if the bit configurations represent sudden changes in block energy or in pitch value.

In order to improve communications between mobile telephones possessing at least one type of source encoding in common, the tandem free operation or "transcoder free operation" (TFO) standard has been defined for TRAUs (ETSI GSM Recommendation 04.53 of September 1998).

That standard has been defined on the basis of the observation that two mobile telephones possessing at least one type of source encoding in common can communicate through the telephone network without any transcoding by TRAU equipment being necessary.

In that standard, two mobile telephones initially communicate the types of source encoding available in each of the telephones. If amongst these types there exists a type which is common to both of them, then a mode of communication without transcoding is set up, i.e. the encoded and protected speech information is no longer transcoded in TRAU equipments.

However, if the two telephones do not have a type of source encoding in common or if the mobile telephone is in communication with a fixed telephone without any source encoder, then the speech information is transcoded in TRAU equipment as described above with reference to FIG. 1.

The present invention seeks to mitigate the drawbacks of the above-described methods of transmitting data by proposing a method which enables data to be transmitted reliably and at a high data rate over the mobile telephone speech channel.

To this end, the invention provides a method of transmitting data over a mobile telephone speech channel between a radio telephone terminal having at least one type of source encoding and a data transmitter and/or receiver unit via a mobile telephone network that supports modes of communication with transcoding between different types of source encoding and at least one mode of communication without transcoding that can be set up between two mobile telephones having at least one type of source encoding in common, the method being characterized in that:

while mode of communication is being negotiated between said radio telephone terminal and said data transmitter and/or receiver unit, the data and/or reception unit sends one of the types of source encoding available to the terminal to said terminal to engage in said mode of communication without transcoding; and data is transmitted over the mobile telephone network in frames reserved for speech signals encoded with the type of source encoding selected for the mode of communication.

The method of the invention can also include one or more of the following characteristics:

while negotiating the mode of communication, the radio telephone terminals sends all of the types of source encoding that are available to it to said unit, and said transmitter and/or receiver unit selects one of the types of source encoding it has received and sends it to said terminal;

said transmitter and/or receiver unit selects the first-received type of source encoding;

said transmitter and/or receiver unit selects the type of source encoding that enables the highest data rate;

while negotiating the mode of communication, said transmitter and/or receiver unit sends to said terminal all of the types of source encoding authorized over the mobile telephone network;

said mode of communication without transcoding is a mode of communication without transcoding in application of the ETSI GSM 04.53 standard for TFO;

said transmitter and/or receiver unit is a data server or an applications server;

said transmitter and/or receiver unit is located in a wired telephone network; and the radio telephone terminal is a mobile telephone or a portable computer fitted with means for communicating via the mobile telephone network.

Figure 2:
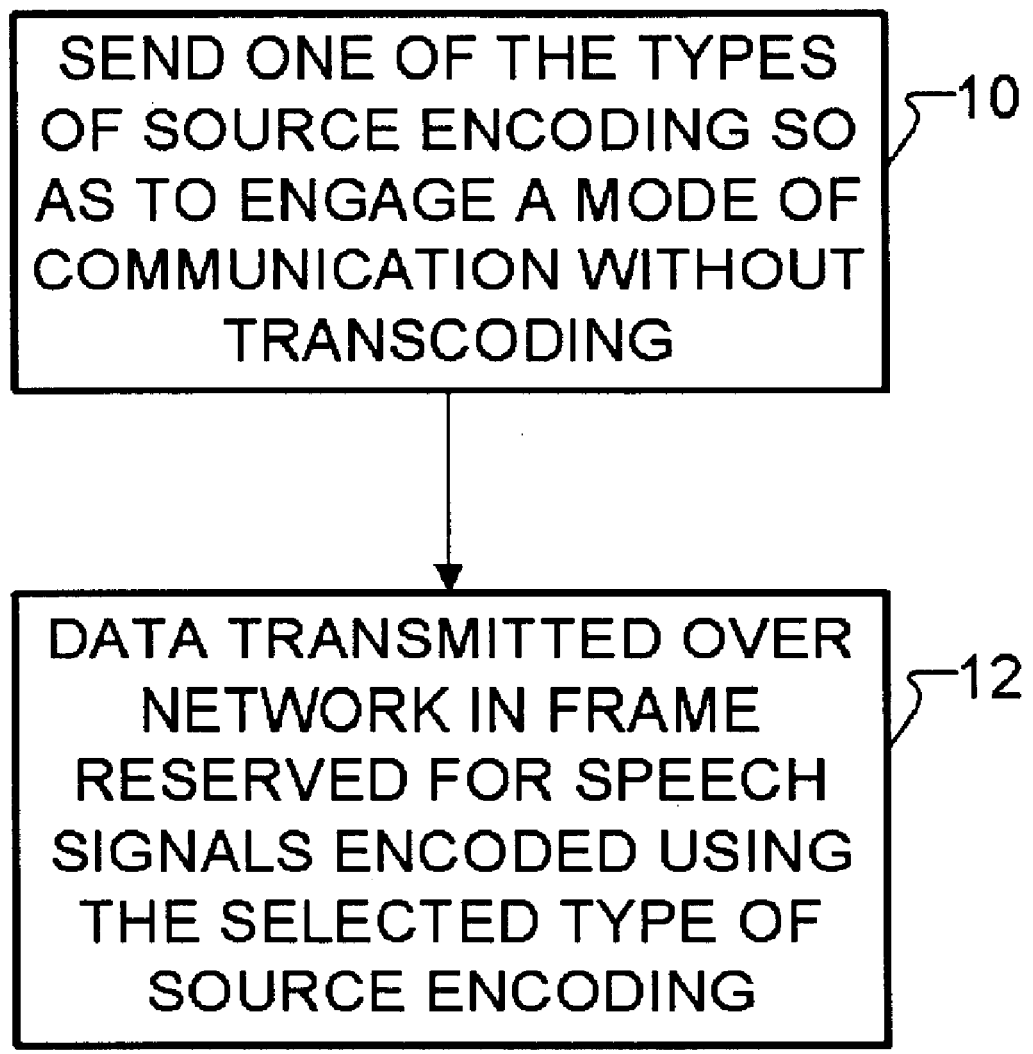

The invention will be better understood on reading the following description and on examining the accompanying figures. The figures are given purely by way of non-limiting indication of the invention. They show:

FIG. 1: already described, a diagram of the GSM network and the various transcoding stages encountered; and FIG. 2: a diagram to illustrate the various stages of the method of the invention.

The method of the invention relates to transmitting data over a mobile telephony speech channel between a radio telephone terminal such as a mobile telephone or a portable computer fitted with means for communicating via the mobile telephone network, said terminal having at least one type of source encoding, and a data transmitter and/or receiver unit such as a data server, an Internet server, another mobile telephone, or a computer which is, for example, connected to a wired telephone network.

This transmission takes place via a mobile telephone network, e.g. the GSM, DCS, or UMTS network, which carries both modes of communication with transcoding between different types of source encoding as described above with reference to FIG. 1, and at least one mode of communication without transcoding between two mobile telephones having at least one type of source encoding in common.

This type of communication without transcoding is preferably in a mode of communication in compliance with the TFO standard (ETSI GSM Recommendation 04.53 of September 1998). That recommendation is included by reference in the present description, in particular with its procedures for negotiating the type of call and its protocols for exchanging speech information, in particular between two mobile telephones.

As shown diagrammatically in FIG. 2, during a first stage 10 which takes place during mode of communication negotiation between said radio telephone terminal and said data transmitter and/or receiver unit, the transmitter and/or receiver unit sends one of the types of source encoding to said terminal to the terminal so as to engage said mode of communication without transcoding.

Several variants can be envisaged for the negotiation stage.

In a first variant, the radio telephone terminal initially sends all of the types of source encoding it has available to said unit.

For example, if it is assumed that the mobile telephone has FR and HR source encoding available, it sends those two types of source encoding to the transmitter and/or receiver unit.

Thereafter, the transmitter and/or receiver unit selects one of the types of source encoding it has received and sends it to said terminal so that communication can be established without transcoding.

Which type of source encoding that is to be sent back can be selected on various criteria. A preferred criterion is for the transmitter and/or receiver unit to select the first received type of source encoding.

In another preferred criterion, the transmitter and/or receiver unit selects the type of source encoding that enables the highest data rate.

In GSM standard 04.53 for TFO, a frame of length 20 ms contains 160 bits for a TFO mode of communication using HR source encoding, while a frame using EFR source encoding or FR source encoding contains 320 bits. Consequently, it is preferable to set up communication using one of the latter two modes if data rate is the selection criterion.

In a second variant, the transmitter and/or receiver unit sends all of the authorized types of source encoding over the mobile telephone network to the terminal so that the terminal can immediately engage in communication without transcoding.

The transmitter and/or receiver unit does not necessarily have source encoding available. It may be fitted merely with means for detecting the types of source encoding sent by the mobile telephone and means for sending in one of those types of source encoding. In addition, it has means for preparing data in the encoded speech frames of the selected type of communication and means for recovering data from such frames.

Then, in a step 12, the data is transmitted over the mobile telephone network in frames reserved for speech signals encoded using the selected type of source encoding.

Since these frames are not subjected to any transcoding in this mode of communication, data transmission is reliable, naturally ignoring any problems that may arise in the radio path of the link.

Furthermore, a raw data rate of 13 Kbit/s is available which is much higher than the data rate that can presently be obtained using the SMS data channels or the USSD channels, for example.

Depending on the requirements for data transmission, it is possible to transmit data in encoded manner. Thus, in the event of an interruption in framing or in the event of a frame error, a "data link" method can be applied enabling erroneous frames to be repeated. Thus, specific encoding is provided so that even in the event of a short interruption of the radio link with the mobile telephone, data transmission can restart from the stage immediately prior to the interruption.

Naturally, data transmission can be performed equally well in the direction mobile telephone to transmitter and/or receiver units as in the opposite direction.

In a preferred embodiment where said data transmitter and/or receiver units is an applications server or a data server advantageously external to the radio telephone network, and compliant with the wireless application protocol (wap) standard, the present invention enables a user to use a radio telephone terminal to access the internet in accelerated manner without thereby increasing call charging costs.

What is claimed is:

1. A method of transmitting data over a mobile telephone speech channel between a radio telephone terminal, said radio telephone terminal having at least one type of source encoding and a data transmitter and/or receiver unit, said data transmitter being part of a network that supports modes of communication with transcoding between different types of source encoding and at least one mode of communication without transcoding, that can be set up between two mobile telephones having at least one type of source encoding in common, said method including:

negotiating a selected mode of communication between said first mobile telephone terminal and said data transmitter and/or receiver unit, wherein the data transmitter unit sends one of the types of source encoding available to the first mobile terminal to said second mobile terminal to engage in said mode of communication without transcoding; and transmitting data over the mobile telephone network in frames reserved for speech signals encoded with the type of source encoding selected for the mode of communication.

2. The method according to claim 1, wherein while negotiating the mode of communication, the first radio telephone terminals sends all of the types of source encoding that are available to it to said transmitter and/or receiver unit.

3. The method according to claim 2, wherein said transmitter and/or receiver unit selects the first-received type of source encoding.

4. The method according to claim 2, wherein said transmitter and/or receiver unit selects the type of source encoding that enables the highest data rate.

5. The method according to claim 1, wherein while negotiating the mode of communication, said transmitter and/or receiver unit sends to said second mobile terminal all of the types of source encoding authorized over the mobile telephone network.

6. The method according to claim 1, wherein said mode of communication without transcoding is a mode of communication without transcoding in application of the ETSI GSM 04.53 standard for TFO.

7. The method according to claim 1, wherein said transmitter and/or receiver unit is located in a wired telephone network.

8. The method according to claim 1, wherein a portable computer is fitted with means for communicating in the mobile telephone network.

9. The method according to claim 1, wherein said transmitter and/or receiver unit selects one of the types of source encoding it has received from the first mobile terminal and sends it to said second mobile terminal.

10. An apparatus, for transmitting data over a speech channel by encoding the data using a selected type of source encoding, comprising:

a first mobile telephone terminal having at least one type of source encoding;

a second mobile telephone terminal having at least one type of source encoding in common with said first mobile telephone terminal; and a data transmitter and/or receiver unit, wherein said data transmitter and/or receiver unit is a part of a network that supports modes of communication with transcoding between different types of source encoding, and supports at least one mode of communication without transcoding;

wherein said apparatus is configured to negotiate a selected mode of communication between said first mobile telephone terminal and said data transmitter and/or receiver unit, wherein the data transmitter and/or receiver unit sends one of the types of source encoding available to said first mobile terminal to said second mobile terminal to engage in said mode of communication without transcoding; and wherein said apparatus is configured to transmit data over the mobile telephone network in frames reserved for speech signals encoded with the type of source encoding selected for said mode of communication.

11. The apparatus according to claim 10, wherein the first mobile telephone terminal is configured to send all of the types of source encoding that are available to said first mobile telephone terminal to said transmitter and/or receiver unit while said apparatus negotiates said mode of communication.

12. The apparatus according to claim 11, wherein said transmitter and/or receiver unit is configured to select the first-received type of source encoding.

13. The apparatus according to claim 11, wherein said transmitter and/or receiver unit is configured to select the type of source encoding that enables the highest data rate.

14. The apparatus according to claim 10, wherein said transmitter and/or receiver unit is configured to send to said second mobile terminal all of the types of source encoding authorized over the mobile telephone network while said apparatus negotiates said mode of communication.

15. The apparatus according to claim 10, wherein said mode of communication without transcoding is a mode of communication without transcoding in application of the ETSI GSM 04.53 standard for TFO.

16. The apparatus according to claim 10, wherein said transmitter and/or receiver unit is located in a wired telephone network.

17. The apparatus according to claim 10, further comprising a portable computer which is fitted with a means for communicating in the mobile telephone network.

18. The apparatus according to claim 10, wherein said transmitter and/or receiver unit is configured to select one of the types of source encoding it has received from the first mobile terminal and send it to said second mobile terminal.

* * * * *